US012425269B2

(12) United States Patent
White et al.

(10) Patent No.: US 12,425,269 B2
(45) Date of Patent: Sep. 23, 2025

(54) CONFIGURATION OF A PRIVATE NETWORK SEGMENT

(71) Applicant: UNDERLINE TECHNOLOGIES, LLC, New York, NY (US)

(72) Inventors: Jason S. White, Acton, MA (US); Harikrishna Rajagopalan, Pflugerville, TX (US); Kyle Dale Glaeser, Jonestown, TX (US); Robert W. Thompson, Dallas, TX (US)

(73) Assignee: UNDERLINE TECHNOLOGIES, LLC, New York, NY (US)

( * ) Notice: Subject to any disclaimer, the term of this patent is extended or adjusted under 35 U.S.C. 154(b) by 62 days.

(21) Appl. No.: 18/164,969

(22) Filed: Feb. 6, 2023

(65) Prior Publication Data

US 2023/0254182 A1 Aug. 10, 2023

Related U.S. Application Data

(60) Provisional application No. 63/308,086, filed on Feb. 9, 2022.

(51) Int. Cl.
*H04L 12/46* (2006.01)

(52) U.S. Cl.
CPC ...... *H04L 12/4683* (2013.01); *H04L 12/4633* (2013.01)

(58) Field of Classification Search
CPC .................. H04L 12/4683; H04L 12/4633
See application file for complete search history.

(56) References Cited

U.S. PATENT DOCUMENTS

| 2012/0320918 | A1 | 12/2012 | Fomin et al. |
| 2013/0124750 | A1* | 5/2013 | Anumala ............ H04L 12/4633 709/232 |
| 2014/0307578 | A1 | 10/2014 | Desanti |
| 2015/0195137 | A1 | 7/2015 | Kashyap et al. |
| 2017/0170989 | A1* | 6/2017 | Sridhar ............... H04L 12/4633 |

(Continued)

OTHER PUBLICATIONS

International Search Report dated May 17, 2023 for PCT Appl. No. PCT/US2023/012376.

(Continued)

*Primary Examiner* — Mohamed A. Wasel
(74) *Attorney, Agent, or Firm* — Ohlandt, Greeley and Perle, L.L.P.

(57) ABSTRACT

A system that comprises an IP-routed interregional distribution network, each comprised of two or more IP-routed regional distribution networks (RDN), each of which employs two or more user-network interfaces (UNIs), each including (a) a physical network including any device capable of operating at network layers 2 and 3, (b) a first virtual broadcast domain (VBD), (c) a second VBD, (d) a regional virtual extensible local area network (VXLAN), and (e) a protocol transformation stack (PTS). The UNI is adapted for layer 2 connection to a user device via the first VBD, and adapted for layer 3 communication over the IP-routed RDN via the VXLAN. The PTS is adapted to convert a layer 2 broadcast domain to/from an IP-routable form by mapping the first VBD to the second VBD, encapsulating the second VBD into the regional VXLAN, and translating that VXLAN into a second interregional VXLAN.

9 Claims, 7 Drawing Sheets

(56) References Cited

U.S. PATENT DOCUMENTS

| | | |
|---|---|---|
| 2020/0076708 A1 | 3/2020 | Kloberdans et al. |
| 2020/0313968 A1 | 10/2020 | Pani et al. |
| 2021/0135903 A1* | 5/2021 | Natarajan ............... H04L 45/16 |
| 2022/0210158 A1* | 6/2022 | Brar ........................ H04L 45/16 |
| 2022/0263789 A1* | 8/2022 | King ................... H04L 45/7453 |

OTHER PUBLICATIONS

Written Opinion dated May 17, 2023 for PCT Appl. No. PCT/US2023/012376.

* cited by examiner

CONFIGURATION OF A PRIVATE NETWORK SEGMENT

CROSS REFERENCE TO RELATED APPLICATION

The present application claims the benefit under 35 U.S.C. § 119 of U.S. Provisional Patent Application No. 63/308,086, filed on Feb. 9, 2022, the contents of which are incorporated herein by reference.

BACKGROUND OF THE DISCLOSURE

1. Field of the Disclosure

The present disclosure relates to a data communication network, and more particularly, to a network that includes a private network segment.

2. Description of the Related Art

The approaches described in this section are approaches that could be pursued, but not necessarily approaches that have been previously conceived or pursued. Therefore, the approaches described in this section may not be prior art to the claims in this application and are not admitted to be prior art by inclusion in this section.

Best practice for Ethernet broadcast domains is to keep the number of member devices small. This is because every device within a broadcast domain maintains a content addressable memory (CAM) table containing a media access control (MAC) address of every other device in the same broadcast domain discovered by examining the Ethernet frames of the packets the device receives. When the number of devices on the broadcast domain grows large, the CAM tables of every device become overloaded and device performance degrades. The problem is compounded by Virtual Local Area Networks (VLANs), which establish private virtual broadcast domains (VBDs) between network devices. The so-called QinQ protocol (IEEE 802.1ad standard) allows for VLANs to be stacked to address limitations of scale. Each stacked pair of VLANs in QinQ also establishes a private VBD. Broadcast domains are private because it is only possible for devices configured on the domain to communicate with each other. Usually, the scope of a broadcast domain is limited to the devices within a small Local Area Network (LAN). Network users in homes and offices rely on the privacy and performance of LANs. A large number of devices is required to extend across geographical distance, such as from San Francisco to Boston, from Buenos Aires to Tokyo, or between each nation's space command center to the International Space Station. When users desire to extend the privacy and performance of their LAN across geographical distance another solution must be found. Moreover, when networks are required to provide private connectivity at scale, the limit of the number of possible VLANs on a network device is 4,094 and the limit of the combinations of stacked VLANs in QinQ is around $4,094^2$ (approximately 16 million). Thus, separate parallel networks would need to be deployed to accommodate a larger number of broadcast domains. There are other ways to connect geographically distant users, for example through Virtual Private Networks (VPNs) or Wide Area Networks (WANs). However, these solutions require routing between multiple broadcast domains, sometimes in ways that compromise the privacy, performance, or cost efficiency of the network.

There is a need for a broadcast domain that can be extended over geographically distant locations without having an inherent limit to the number of member devices, while also maintaining privacy, high performance, and cost efficiency. Additionally, there is a need for a framework to scale the number of broadcast domains that can be hosted on numerous devices over geographical distance.

SUMMARY OF THE DISCLOSURE

There is provided a system that includes an IP-routed interregional distribution network, and a user-network interface (UNI) that employs (a) a first virtual broadcast domain (VBD), (b) a second VBD, (c) a virtual extensible local area network (VXLAN), and (d) a protocol transformation stack. The UNI is adapted for layer 2 connection to a user device via the first VBD, and adapted for layer 3 communication over the IP-routed interregional distribution network via the VXLAN. The protocol transformation stack is adapted to convert a layer 2 broadcast domain to/from an IP-routable form by mapping the first VBD to the second VBD, and encapsulating the second VBD into the VXLAN.

BRIEF DESCRIPTION OF THE DRAWINGS

A component or a feature that is common to more than one drawing is indicated with the same reference number in each of the drawings.

DETAILED DESCRIPTION OF THE DISCLOSURE

A user is any entity that desires or is required to communicate over a network including for example, software programs, sensors, control elements, IoT devices, network devices, and persons.

A user device is a network device employed by a user as a connection point to a network over which the user desires or is required to communicate.

An endpoint is a device that terminates a network owner/operator's network, e.g., private network infrastructure 135 described herein, and terminates and provides connection points for user devices.

An access zone is a physical location that contains network devices that aggregate traffic from endpoints.

A distribution zone is a physical location that contains network devices that aggregate traffic from access zone devices.

A regional zone is a physical location that contains network devices that route traffic among distribution zone devices.

An interregional zone is a physical location that contains network devices that route traffic among regional zone devices.

A private network infrastructure is comprised of endpoint, access zone, distribution zone, regional zone, and interregional zone network devices and network cabling to connect devices together. The network is owned and operated by a private business entity and is not part of the public Internet.

A private network segment is a part of the configuration of the private network infrastructure that connects two or more endpoints in such a way that all other endpoints within the private network infrastructure cannot receive, transmit, or have awareness of the communications between the endpoints connected on the private network segment.

Layer 1 connectivity refers to the Physical Layer in the Open Systems Interconnection (OSI) model of networks (the OSI Model).

A layer 2 Ethernet connection point is any virtual or physical interface within a network device that provides up to OSI Model Layer 2 service, and no higher layer services.

A virtual local area network (VLAN) is defined by the Institute of Electrical and Electronics Engineers (IEEE) in standard 802.1q.

QinQ is a stacked pair of VLANs as defined by the Institute of Electrical and Electronics Engineers (IEEE) in standard 802.1ad.

A virtual broadcast domain (VBD) is established either by a VLAN or a QinQ stacked VLAN pair.

A layer 2 endpoint VBD is the OSI Model Layer 2 Ethernet connection point for an endpoint device.

An Ethernet packet is a formatted unit of data containing a frame, which carries layer 2 information, and a payload, which carries information related to higher-layer protocols.

A broadcast is the layer 2 "broadcast, unknown-unicast, multicast" (BUM) protocol which allows a device to send a packet to all other devices to which it is connected.

"Broadcast domain" is a term of art for a set of devices that are linked on layer 2 and able to receive broadcasts from each other. When devices are on the same broadcast domain, they can establish higher-layer communication with each other that cannot be snooped upon by devices outside the broadcast domain.

A layer 3 network contains devices that route network packets in a procedural and functional manner. The principal protocol for such routing is the Internet Protocol (IP). In an IP network, each device has an IP address. IP addresses are configured within subnets, which are subdivisions of the total IP address space.

An IP-routed network is a network within which packets may be routed by IP-routing protocols such as Routing Information Protocol, Open Shortest Path First protocol, and Border Gateway Protocol (BGP).

A packet in IP-routable form refers to a packet whose frame is of a format required by an IP-routing protocol for transmission over an IP-routed network.

A virtual extensible local area network (VXLAN) is defined by the Internet Engineering Task Force (IETF) by standard RFC-7348. VXLANs encapsulate layer 2 VBD packets into IP-routable form. Also, conversely, VXLANs decapsulate packets from IP-routable form into layer 2 VBD packets.

Network users in homes and offices rely on the privacy and performance of LANs. However, a large number of devices is required to extend across geographical distance. There are other ways to connect geographically distant users, for example through Virtual Private Networks (VPNs) or Wide Area Networks (WANs). However, these solutions require routing between multiple broadcast domains, sometimes in ways that compromise the privacy, performance, or cost efficiency of the network.

Advantageously, system 100 of the present disclosure solves this problem by extending the Ethernet broadcast domain to geographically distant locations while keeping the number of devices required in the broadcast domain to a minimum. Thus, parties wishing to communicate over geographical distance may do so with the familiar privacy and simplicity of the LAN.

Figure 1:
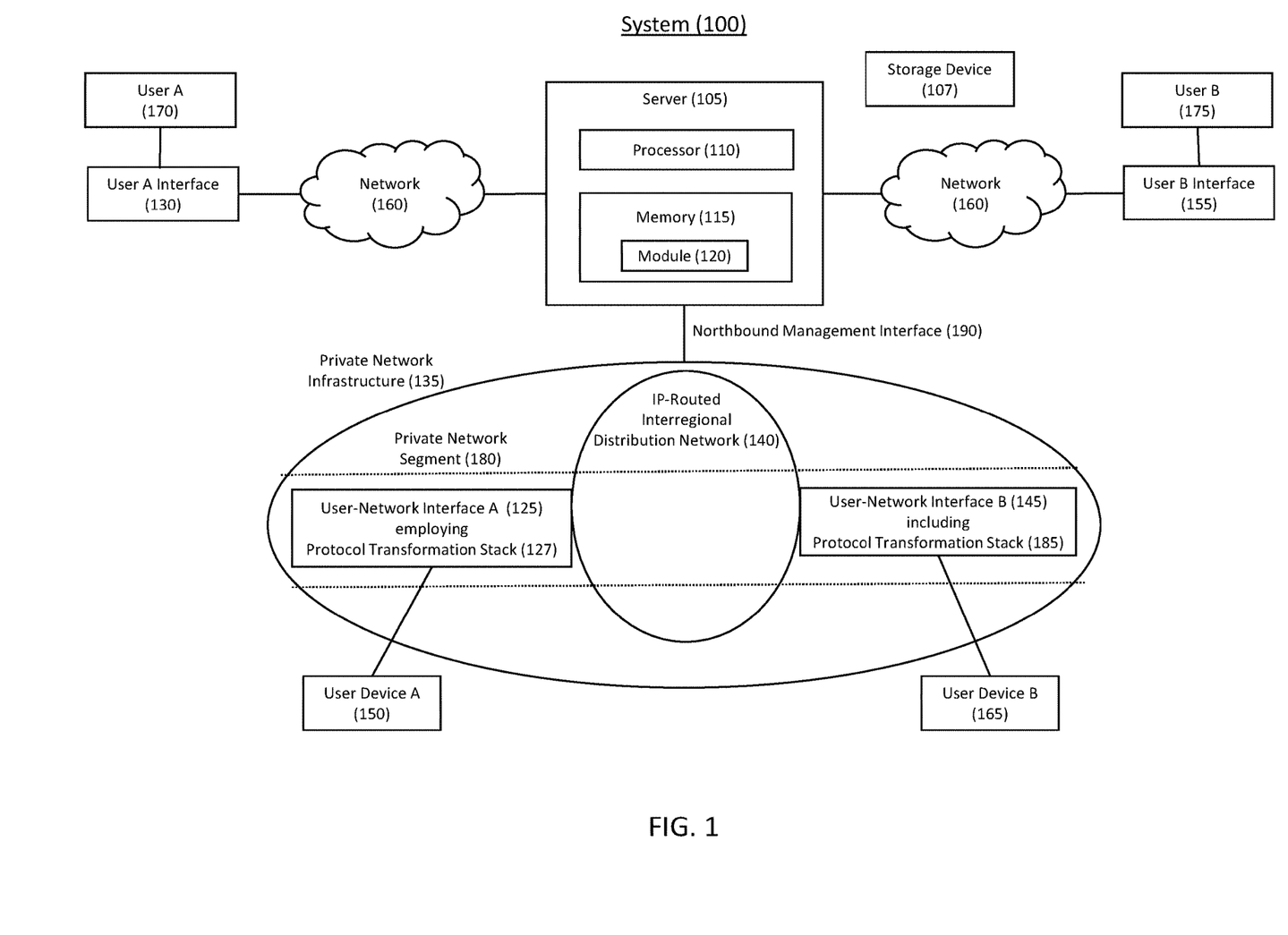
FIG. 1 is a block diagram of a system having a private network segment.

FIG. 1 is a block diagram of a system 100 having a private network segment 180 that provides network connectivity between a user device A 150 and a user device B 165.

System 100 includes a server 105, a user A interface 130 and a user B interface 155 that are communicatively coupled to a network 160.

Network 160 is a data communications network, and may include any or all of (a) a personal area network, e.g., covering a room, (b) a local area network, e.g., covering a building, (c) a campus area network, e.g., covering a campus, (d) a metropolitan area network, e.g., covering a city, (e) a wide area network, e.g., covering an area that links across metropolitan, regional, or national boundaries, (f) satellite-based networks, (g) networks covering links between and among space command, space crafts, and satellites, (h) the Internet, or (i) a telephone network. Communications are conducted via network 160 by way of electronic signals that propagate through a wire, or optical signals that propagate through an optical fiber, or are transmitted and received wirelessly.

Server 105 includes a processor 110, and a memory 115 that is operationally coupled to processor 110. Although server 105 is represented herein as a standalone device, it is not limited to such, but instead can be coupled to other devices (not shown) in a distributed processing system.

Processor 110 is an electronic device configured of logic circuitry that responds to and executes instructions.

Memory 115 is a tangible, non-transitory, computer-readable storage device encoded with a computer program. In this regard, memory 115 stores data and instructions, i.e., program code, that are readable and executable by processor 110 for controlling operations of processor 110. Memory 115 may be implemented in a random access memory (RAM), a hard drive, a read only memory (ROM), or a combination thereof. One of the components of memory 115 is a module 120.

Module 120 is a program module that contains instructions for controlling processor 110 to execute operations described herein. The term "module" is used herein to denote a functional operation that may be embodied either as a stand-alone component or as an integrated configuration of a plurality of subordinate components. Thus, module 120 may be implemented as a single module or as a plurality of modules that operate in cooperation with one another. Moreover, although module 120 is described herein as being installed in memory 115, and therefore being implemented in software, it could be implemented in any of hardware (e.g., electronic circuitry), firmware, software, or a combination thereof.

While module 120 is indicated as being already loaded into memory 115, it may be configured on a storage device 107 for subsequent loading into memory 115. Storage device 107 is a tangible, non-transitory, computer-readable storage device that stores module 120 thereon. Examples of storage device 107 include (a) a read only memory, (b) an optical storage medium, (c) a hard drive, (d) a memory unit consisting of multiple parallel hard drives, (e) flash drive, (f) a random access memory, and (g) an electronic storage device coupled to server 105 via network 160 or a private network infrastructure 135.

User A interface 130 includes an input device, such as a keyboard, a speech recognition subsystem, a cursor control, a touch-sensitive screen, or a gesture recognition subsystem, for enabling a user A 170, to communicate information to and from other devices via network 160. User A interface 130 also includes an output device such as a display or a speech synthesizer and a speaker. User A interface 130 may be implemented for human use, for example, on a device such as a personal computer, tablet, smart watch, smart phone, or industrial human-machine interface, either in graphical form or as a command-line interface on any such device. User A interface 130 may also be implemented as an application programming interface (API), development operations (DevOps) module, or network management system (NMS) module, such that interactions with the components within server 105 may be automated.

User B interface 155 is functionally similar to user A interface 130, and enables a user B 175 to communicate information to and from other devices via network 160.

Server 105 facilitates the configuration of private network segment 180 on private network infrastructure 135 by using a northbound management interface 190 to reach the configuration interface of each device in private network infrastructure 135. Network 160 may be the public internet, a private network connection, or a direct cable connection to server 105. Private network infrastructure 135 consists of network devices and cabling not connected to the internet, and managed with server 105. Such network devices and cabling may be owned by the same business entity or may be leased by a third party to the business entity, or a combination of the two. The network devices and cabling may be multitenant, meaning that multiple parties are communicating over them, but it is not possible for any tenant to snoop upon the network traffic of any other tenant. The private network infrastructure may include any type of device and cabling that supports Ethernet communications. The cabling may be replaced by wireless communication protocols on any electromagnetic spectrum.

A user-network interface (UNI) is a set of devices configured to connect from a network infrastructure to a user's network. The communications protocols between the network infrastructure and the user's network are agreed upon in advance so that the user's network devices may be configured to properly receive, transmit, and process network communications with the infrastructure.

Private network segment 180 includes a UNI A 125 and a UNI B 145.

User A 170 desires to connect user device A 150 to user device B 165 over private network infrastructure 135. User device A 150 and user device B 165 can be any device with the ability to connect to a Layer 3 network (computer, phone, camera, thermostat, sensor, industrial control element, Internet of things (IoT)) device, etc., either through hardwired Ethernet cable, fiber optic cable, or wireless protocol.

User device A 150 is connected to private network infrastructure 135 via UNI A 125. UNI A 125 provides a layer 2 Ethernet connection point to private network infrastructure 135.

User device B 165 is connected to private network infrastructure 135 via UNI B 145. UNI B 145 provides a layer 2 Ethernet connection point to private network infrastructure 135.

A protocol transformation stack is a sequence of changes to network packets configured on devices such that the packets fit the transmission and security requirements of the network architecture.

A "switch" is any network device that can perform the functions required in the foregoing description, including an Ethernet switch, a router, a wireless transceiver, a virtualized network function, or any network packet processing component.

As mentioned above, VXLAN packets are IP-routable at layer 3. Therefore, packets can be sent, for example, from a first distribution zone switch to a second distribution zone switch simply by the first switch knowing the second switch's VTEP (VXLAN Tunnel End Point) IP address. There is no need to know anything about the devices along the path to the second switch. Thus, layer 2 broadcast domains can be extended anywhere private network infrastructure 135 can route with IP-routing protocols.

Private network infrastructure 135 includes an IP-routed interregional distribution network 140. Processor 110, pursuant to instructions in module 120, configures components of private network infrastructure 135 for communication via IP-routed interregional distribution network 140.

UNI A 125 employs a protocol transformation stack 127 that transforms packets transmitted to and from both IP-routed interregional distribution network 140 and user device A 150.

UNI B 145 employs a protocol transformation stack 185 that transforms packets transmitted to and from both IP-routed interregional distribution network 140 and user device B 165.

Figure 2:
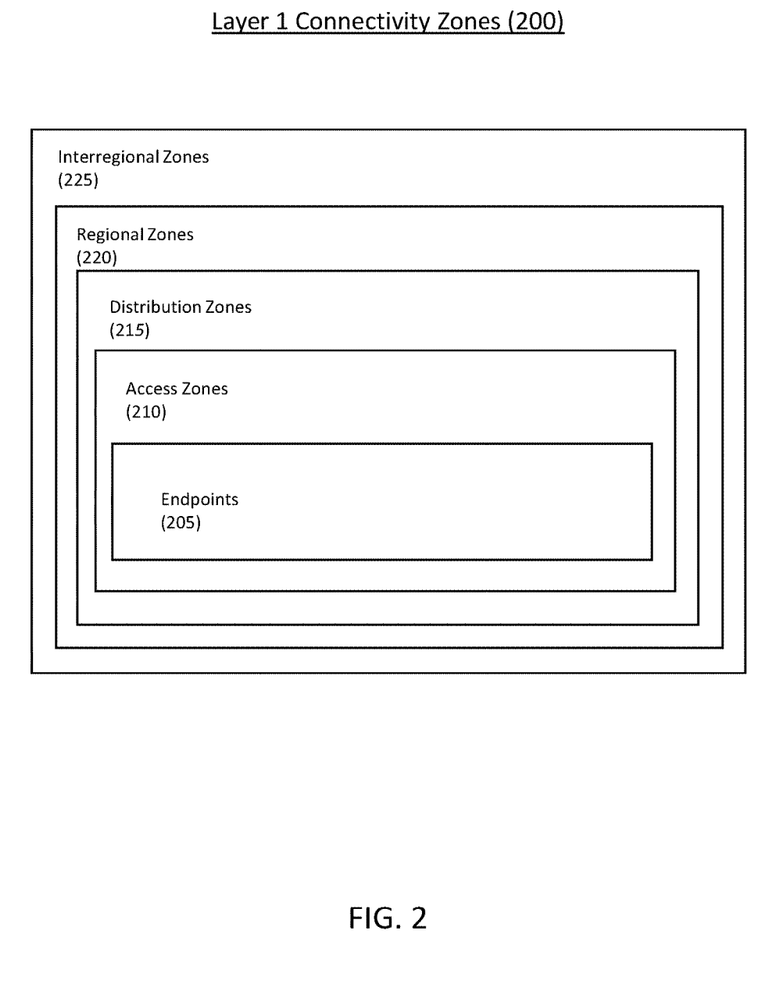
FIG. 2 is a conceptual diagram of a hierarchy of layer 1 connectivity zones.

FIG. 2 is a conceptual diagram of a hierarchy of layer 1 connectivity zones. Private network infrastructure 135 is deployed over several layer 1 connectivity zones 200, namely access zones 210, distribution zones 215, regional zones 220 and interregional zones 225. A zone is a geographic region, where each higher-level zone in the hierarchy is a larger geographic region.

Endpoints 205 are deployed at locations convenient to users, e.g., at the home, business, or physical location of user A 170 and user B 175.

Endpoints 205 are switches that connect to private network infrastructure 135 via network devices such as switches, routers, or wireless transceivers deployed in access zones 210. Endpoints 205 may connect within the same access zone 210 or in different access zones 210 that are geographically distant from one another.

Network devices deployed in a distribution zone 215 connect network devices deployed in several access zones 210 that are geographically distant from one another.

Network devices deployed in a regional zone 220 connect network devices deployed in several distribution zones 215 that are geographically distant from one another.

Network devices deployed in an interregional zone 225 connect network devices deployed in several regional zones 220 that are geographically distant from one another.

Thus, private network infrastructure 135 is composed of hierarchically-arranged network devices such that endpoints 205 may connect across a geographical distance.

Figure 3:
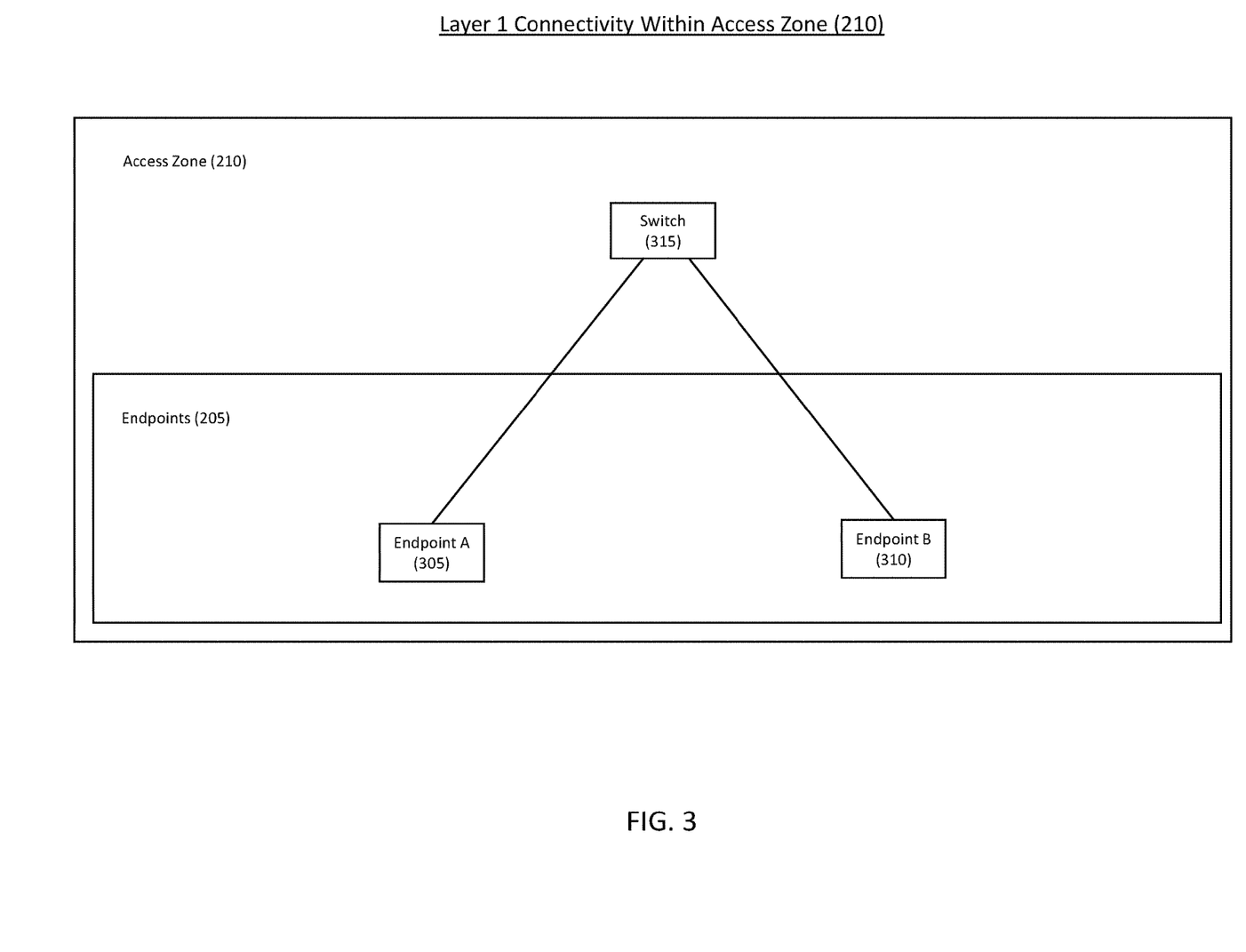
FIG. 3 is a conceptual diagram of an example of layer 1 connectivity within an access zone, and more specifically, an example of connecting endpoints via layer 1 connectivity across an access zone.

FIG. 3 is a conceptual diagram of an example of layer 1 connectivity within an access zone, and more specifically, an example of connecting endpoints 205 via layer 1 connectivity within access zone 210.

Endpoint A 305 and endpoint B 310 exist within the same access zone 210.

Switch 315 is a switch (e.g., an Ethernet switch, router, or wireless transceiver) in access zone 210. Switch 315 connects to endpoint A 305 and endpoint B 310. Thus, network traffic may flow between endpoint A 305 and endpoint B 310.

Figure 4:
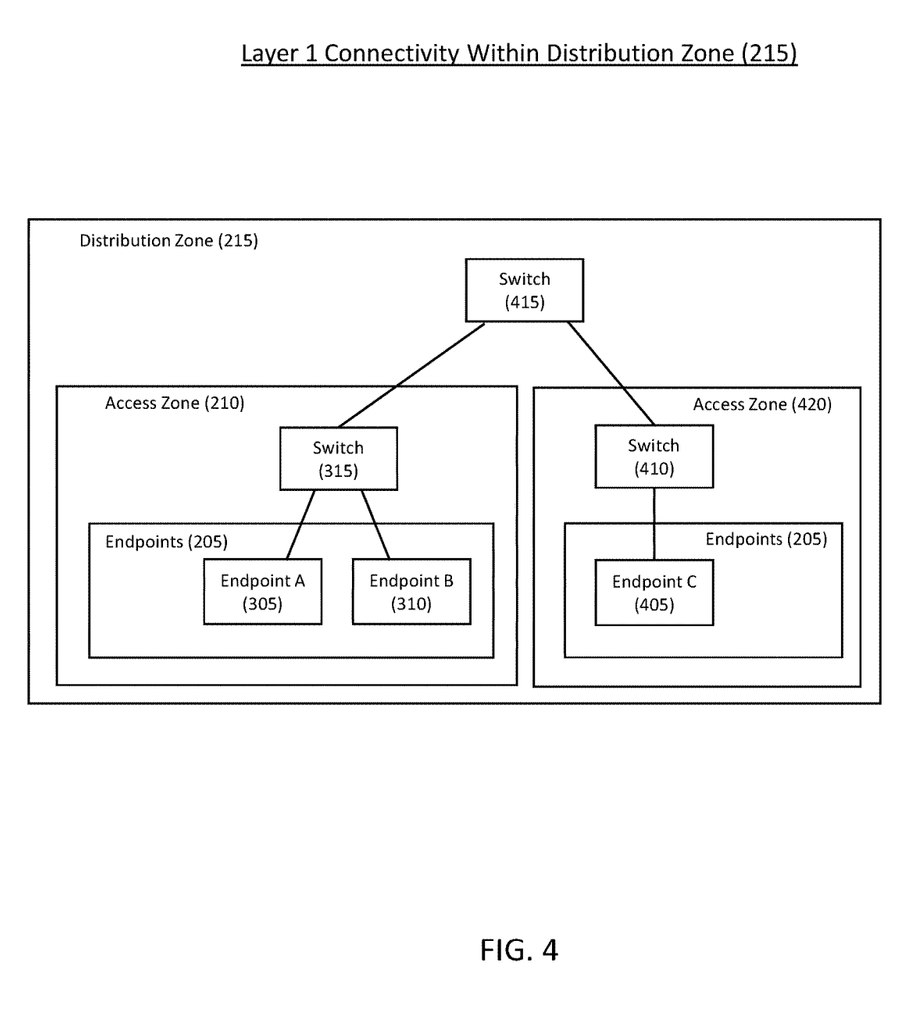
FIG. 4 is a conceptual diagram of an example of layer 1 connectivity within a distribution zone, and more specifically, an example of connecting endpoints via layer 1 connectivity across a distribution zone.

FIG. 4 is a conceptual diagram of an example of layer 1 connectivity within a distribution zone, and more specifically, an example of connecting endpoints 205 via layer 1 connectivity within distribution zone 215.

An endpoint C 405 connects to a switch 410 within an access zone 420.

Access zone 420 exists within the same distribution zone 215 as access zone 210.

A switch 415 in distribution zone 215 connects (a) access zone 210 via switch 315, and (b) access zone 420 via switch 410.

Thus, network traffic may flow between endpoint A 305, endpoint B 310, and endpoint C 405.

Figure 5:
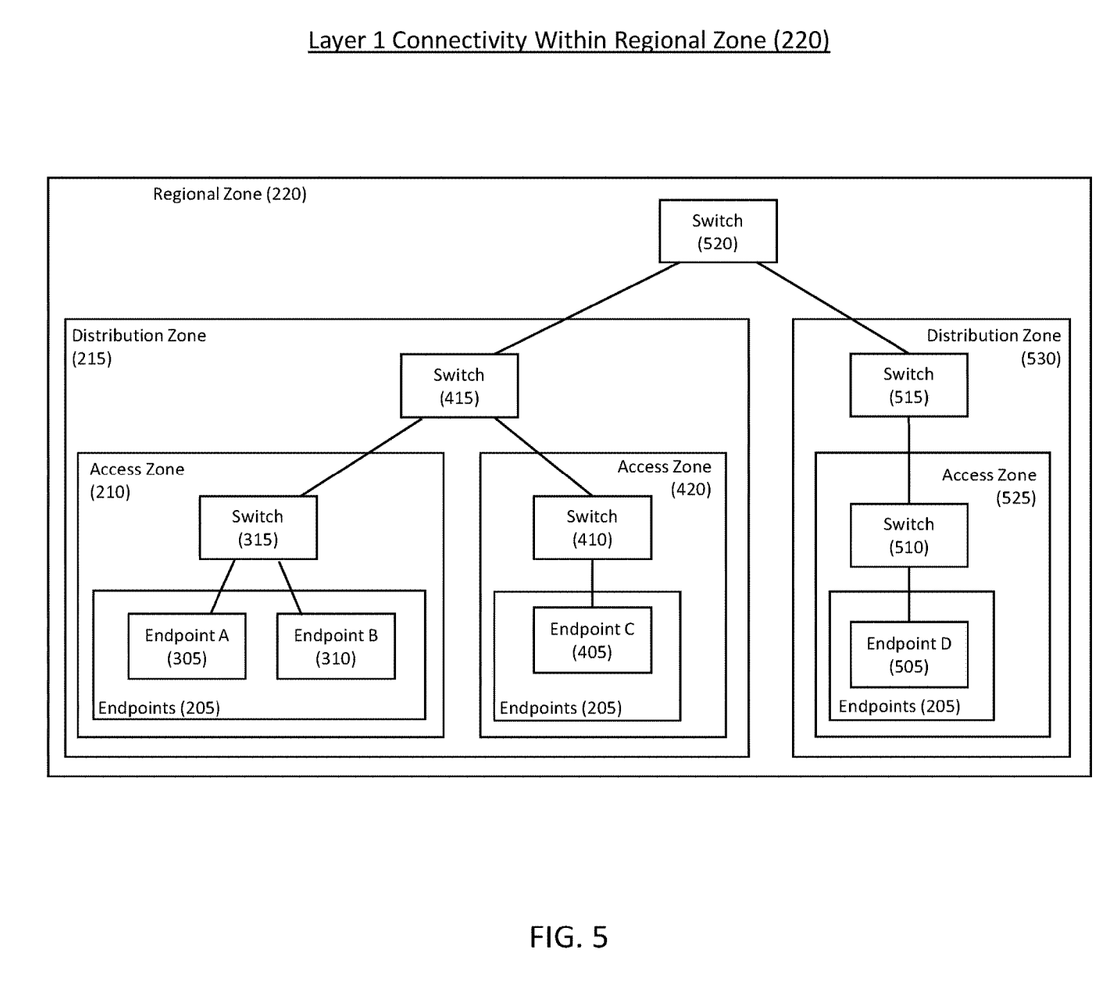
FIG. 5 is a conceptual diagram of an example of layer 1 connectivity within a regional zone, and more specifically, an example of connecting endpoints via layer 1 connectivity across a regional zone.

FIG. 5 is a conceptual diagram of an example of layer 1 connectivity within a regional zone, and more specifically, an example of connecting endpoints 205 via layer 1 connectivity within regional zone 220.

An endpoint D 505 connects to a switch 510 in an access zone 525.

Switch 510 connects to a switch 515 in a distribution zone 530.

Distribution zone 530 exists within the same regional zone 220 as distribution zone 215.

A switch 520 in regional zone 220 connects (a) distribution zone 215 via switch 415, and (b) distribution zone 530 via switch 515.

Thus, network traffic may flow between endpoint A 305, endpoint B 310, endpoint C 405, and endpoint D 505.

Figure 6:
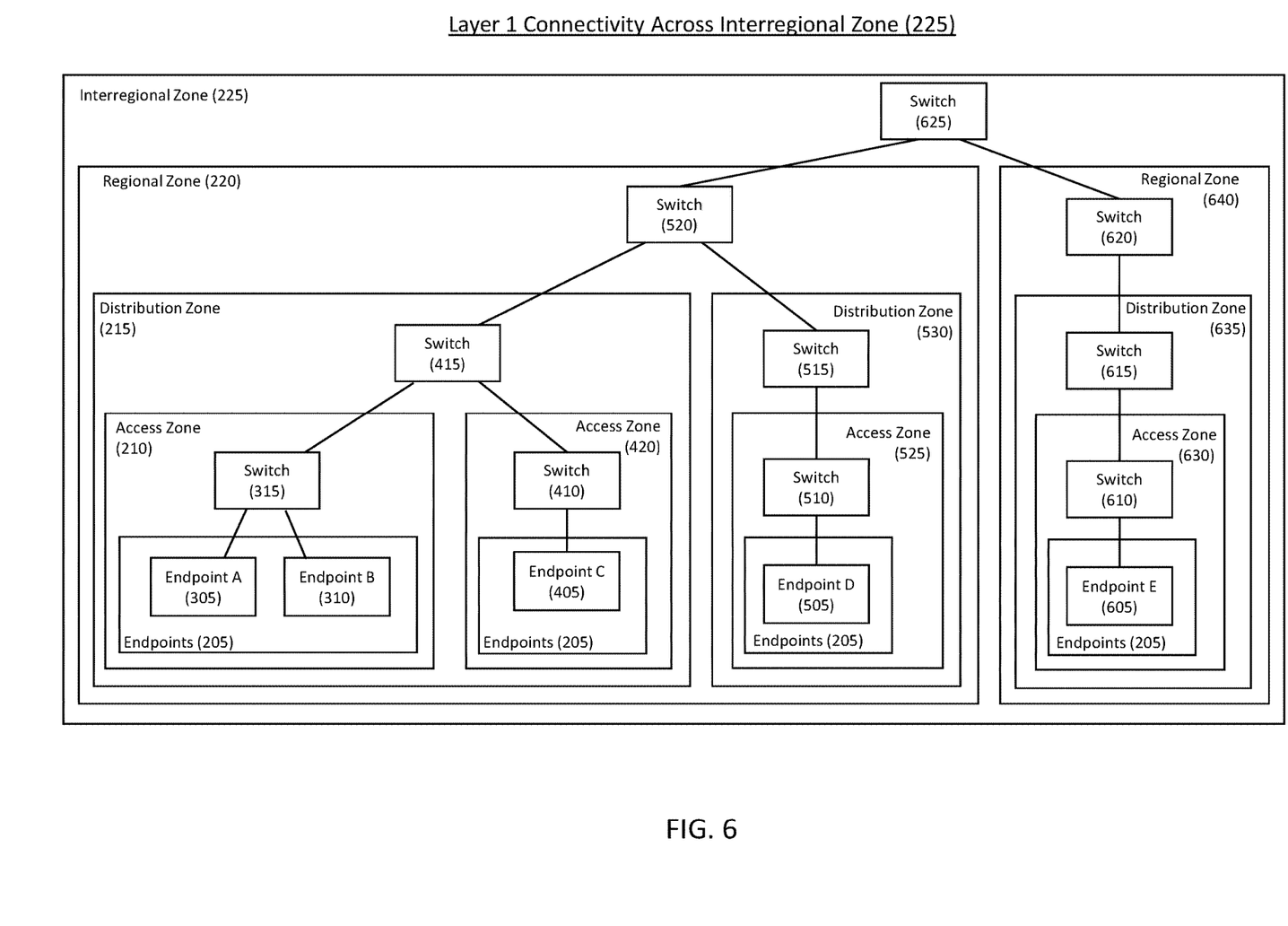
FIG. 6 is a conceptual diagram of an example of layer 1 connectivity across an interregional zone, and more specifically, an example of connecting endpoints via layer 1 connectivity across an interregional zone.

FIG. 6 is a conceptual diagram of an example of layer 1 connectivity across an interregional zone, and more specifically, an example of connecting endpoints 205 via layer 1 connectivity across interregional zone 225.

An endpoint E 605 connects to a switch 610 in an access zone 630.

Switch 610 connects to a switch 615 in a distribution zone 635.

Switch 615 connects to a switch 620 in a regional zone 640.

Regional zone 640 exists within the same interregional zone 225 as regional zone 220.

A switch 625 in interregional zone 225 connects (a) regional zone 220 via switch 520, and (b) regional zone 640 via switch 620.

Thus, network traffic may flow between endpoint A 305, endpoint B 310, endpoint C 405, endpoint D 505, and endpoint E 605.

Given the foregoing layer 1 connectivity between endpoints 205, network devices may now be configured to establish private network segment 180 between endpoints 205.

Figure 7:
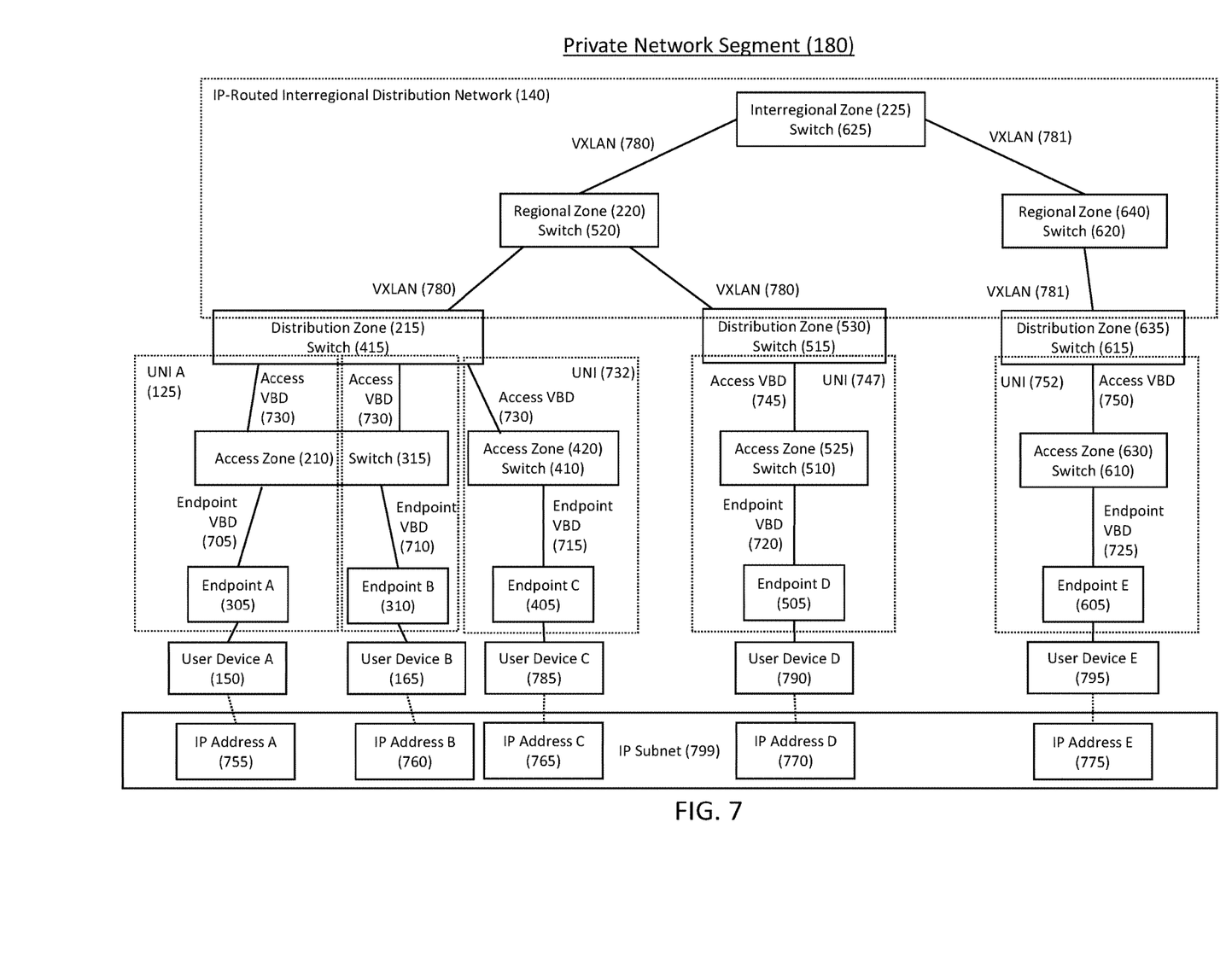
FIG. 7 is a conceptual diagram of an example of a private network segment.

FIG. 7 is a conceptual diagram of an example of a private network segment, and more specifically, private network segment 180. In FIG. 1, private network segment 180 connects two endpoints. However, in FIG. 7, private network segment 180 is extended to connect five endpoints.

Assume for example that endpoint A 305, endpoint B 310, endpoint C 405, endpoint D 505, and endpoint E 605 are to be connected on private network segment 180. To achieve this, private network segment 180 utilizes endpoint VBDs 705, 710, 715, 720 and 725, and access VBDs 730, 745 and 750, and VXLANs 780 and 781.

Endpoint VBD 705 is a layer 2 endpoint VBD configured on a connection between endpoint A 305 and switch 315, and mapped to access VBD 730 by switch 315, thus making endpoint VBD 705 and access VBD 730 members of the same Ethernet broadcast domain.

Endpoint VBD 710 is a layer 2 endpoint VBD configured on a connection between endpoint B 310 and switch 315, and is also mapped to access VBD 730 by switch 315, thus making endpoint VBD 705, endpoint VBD 710 and access VBD 730 members of the same Ethernet broadcast domain.

Endpoint VBD 715 is a layer 2 endpoint VBD configured on a connection between endpoint C 405 and switch 410, and mapped to access VBD 730 by switch 410, thus making endpoint VBD 715 and access VBD 730 members of the same Ethernet broadcast domain.

Endpoint VBD 720 is a layer 2 endpoint VBD configured on a connection between endpoint D 505 and switch 510, and mapped to access VBD 745 by switch 510, thus making endpoint VBD 720 and access VBD 745 members of the same Ethernet broadcast domain.

Endpoint VBD 725 is a layer 2 endpoint VBD configured on a connection between endpoint E 605 and switch 610, and mapped to access VBD 750 by switch 610, thus making endpoint VBD 725 and access VBD 750 members of the same Ethernet broadcast domain.

When two devices are connected, they may be configured to form a broadcast domain over that connection.

Switch 315 and switch 410 are configured to extend access VBD 730 over the connection to switch 415, which is configured to allow communication on VBD 730. This makes endpoint VBD 705, endpoint VBD 710, endpoint VBD 715, and access VBD 730 members of the same Ethernet broadcast domain.

Switch 510 is configured to extend access VBD 745 over the connection to switch 515, which is configured to allow communication on access VBD 745.

Switch 610 is configured to extend access VBD 750 over the connection to switch 615, which is configured to allow communication on access VBD 750.

Endpoint A 305, endpoint VBD 705, switch 315, access VBD 730, and switch 415 constitute UNI A 125 for user device A 150.

Endpoint B 310, endpoint VBD 710, switch 315, access VBD 730, and switch 415 constitute UNI B 145 for user device B 165.

Endpoint C 405, endpoint VBD 715, switch 410, access VBD 730, and switch 415 constitute a UNI 732 for user device C 785.

Endpoint D 505, endpoint VBD 720, switch 510, access VBD 745, and switch 515 constitute a UNI 747 for user device D 790.

Endpoint E 605, endpoint VBD 725, switch 610, access VBD 750, and switch 615 constitute a UNI 752 for user device E 795.

Switch 415 is configured to encapsulate access VBD 730 within VXLAN 780, with the IP addresses of switch 515 and switch 625 as the configured VTEPs.

Switch 515 is configured to encapsulate access VBD 745 within VXLAN 780, with the IP addresses of switch 415 and switch 625 as the configured VTEPs.

Switch 615 is configured to encapsulate access VBD 750 within VXLAN 781, with switch 625 as the configured VTEP.

Switches 415, 515, 520, 615, 620 and 625 are members of IP-routed interregional distribution network 140.

VXLAN 780 network packets are routed via IP-routed interregional distribution network 140, thus making endpoint VBD 705, endpoint VBD 710, endpoint VBD 715, endpoint VBD 720, access VBD 730, and access VBD 745 members of the same Ethernet broadcast domain.

VXLAN 781 network packets are routed via IP-routed interregional distribution network 140.

Switch 625 decapsulates access VBD 730 and access VBD 745 from VXLAN 780 and re-encapsulates them into VXLAN 781. Conversely, switch 625 decapsulates access VBD 750 from VXLAN 781 and re-encapsulates it into VXLAN 780. This allows broadcast domain connectivity across different VXLANs, thus making endpoint VBD 705, endpoint VBD 710, endpoint VBD 715, endpoint VBD 720, endpoint VBD 725, access VBD 730, access VBD 745, and access VBD 750 members of the same Ethernet broadcast domain.

UNI A 125 is connected to IP-routed interregional distribution network 140 via protocol transformation stack 127, and UNI B 145 is connected to IP-routed interregional distribution network 140 via protocol transformation stack 185. Similarly, each of UNI 732, 747 and 752 is connected to IP-routed interregional distribution network 140 via a protocol transformation stack.

The combination of endpoint VBD 705, the mapping of endpoint VBD 705 to access VBD 730, and the encapsulation of access VBD 730 in VXLAN 780 constitutes the outbound portion of protocol transformation stack 127. Conversely, the decapsulation of access VBD 730 from VXLAN 780, the mapping of access VBD 730 to endpoint VBD 705, and endpoint VBD 705 constitutes the inbound portion of protocol transformation stack 127. Protocol transformation stack 127 transforms packets to and from IP-Routed Interregional Distribution Network 140 to maintain a common broadcast domain with the other connected endpoints 205.

UNI A 125 is adapted for layer 2 connection to user device A 150 via endpoint VBD 705, and adapted for layer 3 communication over IP-routed interregional distribution network 140 via VXLAN 780. Protocol transformation stack 127 is adapted to convert a layer 2 broadcast domain to/from an IP-routable form by mapping endpoint VBD 705 to access VBD 730, and encapsulating access VBD 730 into VXLAN 780.

The combination of endpoint VBD 710, the mapping of endpoint VBD 710 to access VBD 730, and the encapsulation of access VBD 730 in VXLAN 780 constitutes the outbound portion of protocol transformation stack 185. Conversely, the decapsulation of access VBD 730 from VXLAN 780, the mapping of access VBD 730 to endpoint VBD 710, and endpoint VBD 710 constitutes the inbound portion of protocol transformation stack 185. Protocol transformation stack 185 transforms packets to and from IP-Routed Interregional Distribution Network (140) to maintain a common broadcast domain with the other connected endpoints 205.

UNI B 145 is adapted for layer 2 connection to user device B 165 via endpoint VBD 710, and adapted for layer 3 communication over IP-routed interregional distribution network 140 via VXLAN 780. Protocol transformation stack 185 is adapted to convert a layer 2 broadcast domain to/from an IP-routable form by mapping endpoint VBD 710 to access VBD 730, and encapsulating access VBD 730 into VXLAN 780.

Similarly, the combination of endpoint VBD 715, the mapping of endpoint VBD 715 to access VBD 730, and the encapsulation of access VBD 730 in VXLAN 780 constitutes the outbound portion of a protocol transformation stack. Conversely, the decapsulation of access VBD 730 from VXLAN 780, the mapping of access VBD 730 to endpoint VBD 715, and endpoint VBD 715 constitutes the inbound portion of a protocol transformation stack. This protocol transformation stack transforms packets to and from IP-Routed Interregional Distribution Network 140 to maintain a common broadcast domain with the other connected endpoints 205.

Similarly, the combination of endpoint VBD 720, the mapping of endpoint VBD 720 to access VBD 745, and the encapsulation of access VBD 745 in VXLAN 780 constitutes the outbound portion of a protocol transformation stack. Conversely, the decapsulation of access VBD 745 from VXLAN 780, the mapping of access VBD 745 to endpoint VBD 720, and endpoint VBD 720 constitutes the inbound portion of a protocol transformation stack. This protocol transformation stack transforms packets to and from IP-Routed Interregional Distribution Network 140 to maintain a common broadcast domain with the other connected endpoints 205.

Similarly, the combination of endpoint VBD 725, the mapping of endpoint VBD 725 to access VBD 750, and the encapsulation of access VBD 750 in VXLAN 781 constitutes the outbound portion of a protocol transformation stack. Conversely, the decapsulation of access VBD 750 from VXLAN 781, the mapping of access VBD 750 to endpoint VBD 725, and endpoint VBD 725 constitutes the inbound portion of a protocol transformation stack. This protocol transformation stack transforms packets to and from IP-Routed Interregional Distribution Network 140 to maintain a common broadcast domain with the other connected endpoints 205.

Thus, private network segment 180 is established as a single layer 2 Ethernet broadcast domain between endpoint A 305, endpoint B 310, endpoint C 405, endpoint D 505, and endpoint E 605.

Private network segment 180 also includes an IP subnet 799, which enables communication at layer 3 and higher between endpoints 205 of private network segment 180.

IP subnet 799 is configured on user device A 150, which is connected via Ethernet to endpoint A 305. User device A 150 is given IP address A 755, which is within IP subnet 799.

IP subnet 799 is configured on user device B 165, which is connected via Ethernet to endpoint B 310. User device B 165 is given IP address B 760, which is within IP subnet 799.

IP subnet 799 is configured on user device C 785, which is connected via Ethernet to endpoint C 405. User device C 785 is given IP address C 765, which is within IP subnet 799.

IP subnet 799 is configured on user device D 790, which is connected via Ethernet to endpoint D 505. User device D 790 is given IP address D 770, which is within IP subnet 799.

IP subnet 799 is configured on user device E 795, which is connected via Ethernet to endpoint E 605. User device E 795 is given IP address E 775, which is within IP subnet 799.

The switches in FIG. 7 are distributed among layer 1 zones to create a scalable architecture that can support millions of separate private network segments.

A switch in an access zone, such as switch 315 in access zone 210, can support a fixed number of endpoints 205, usually limited by the number of physical ports on the switch. For example, many such switches allow only 48 endpoint 205 connections. Multiple access zones 210 can be deployed to reach more endpoints 205.

A switch in a distribution zone, such as switch 415 in distribution zone 215, connects to multiple access zone switches, usually limited by the number of physical ports on the switch. For example, many such switches allow for only 32 connections. Thus, continuing the example, 32 distribution zone switch ports are connected to 32 access zone switches, each with 48 connected endpoints, for a total of 1,536 total connected endpoints. This total of 1,536 connected endpoints may connect to up to 4,094 private network segments within a single distribution zone. The limit of 4,094 is due to the VBD identifier limit defined in the IEEE 802.1q specification. The VBD identifier is a 12-bit segment of the packet frame, with 2 VBD identifiers excluded from use.

As described above, the distribution zone switch encapsulates a VBD within a VXLAN. The IETF RFC-7348 specification for VXLANs places a limit on the number of VXLAN identifiers of 16,000,000 due to its 24-bit identifier length in the packet frame. Thus, an architecture in which a distribution zone switch aggregates up to 4,094 VBDs from its connected access zones and encapsulates them into VXLANs, can accommodate up to 3,908 such distribution zones without exhausting the VXLAN identifier space.

Switches in a regional zone, such as switch 520 in regional zone 220, can in aggregate route up to 16,000,000 VXLANs among the 3,908 distribution zones. Thus, a regional zone can accommodate up to 16,000,000 private network segments.

Switches in an interregional zone, such as switch 625 in interregional zone 225, map a VXLAN from one region to a VXLAN in another region. Endpoint E 605 connects to regional zone 640, which is a different regional zone from the other endpoints of FIG. 7, which connect to regional zone 220. Since each regional zone has full use of the 16,000,000 possible VXLAN identifiers, the interregional zone switches provide a mechanism to map between regional zones. An interregional zone switch requires that VXLAN identifiers be unique in both regions. For example, if interregional zone switch 625 currently maps between VXLAN identifier X in regional zone 220 and VXLAN identifier Y in regional zone 640, then switch 625 may not be subsequently configured with a map that includes VXLAN identifier X or Y. This limitation can be mitigated by adding an additional interregional zone switch.

The architecture described above can scale to any desired number of private network segments connecting any desired number of endpoints.

System 100 allows a layer 2 Ethernet broadcast domain to include a specific and small number of devices that are distributed across geographical space. Best practice for Ethernet broadcast domains is to keep the number of member devices small. This is because every device within a broadcast domain maintains a content addressable memory (CAM) table containing the media access control (MAC) address of every other device in the same broadcast domain discovered by examining the Ethernet frames of the packets the device receives. When the number of devices on the broadcast domain grows large, the CAM tables of every device become overloaded and device performance degrades. The problem is compounded by Virtual Local Area Networks (VLANs), which establish private virtual broadcast domains (VBDs) between network devices. The so-called QinQ protocol (IEEE 802.1ad standard) allows for VLANs to be stacked to address limitations of scale. Each stacked pair of VLANs in QinQ also establishes a private VBD. Broadcast domains are private because it is only possible for the devices configured on the domain to communicate with each other. Usually, the scope of a broadcast domain is limited to the devices within a small Local Area Network (LAN). Network users in homes and offices rely on the privacy and performance of LANs. A large number of devices is required to extend across geographical distance. When users desire to extend the privacy and performance of their LAN across geographical distance another solution must be found. Moreover, when networks are required to provide private connectivity at scale, the limit of the number of possible VLANs on a network device is 4,094 and the limit of the combinations of stacked VLANs in QinQ is around $4,094^2$ (approximately 16 million). Thus, separate parallel networks would need to be deployed to accommodate a large number of broadcast domains. There are other ways to connect geographically distant users, for example through Virtual Private Networks (VPNs) or Wide Area Networks (WANs). However, these solutions require routing between multiple broadcast domains, sometimes in ways that compromise the privacy, performance, or cost efficiency of the network. System 100 solves this problem through a method of extending the Ethernet broadcast domain to geographically distant locations while keeping the number of devices required in the broadcast domain to a minimum. Thus, parties wishing to communicate over geographical distance may do so with the familiar privacy and simplicity of the LAN.

In review, system 100 includes IP-routed interregional distribution network 140, and UNI A 125, which employs endpoint VBD 705, access VBD 730, VXLAN 780, and protocol transformation stack 127. UNI 125 is adapted for layer 2 connection to user device A 150 via endpoint VBD 705, and adapted for layer 3 communication over IP-routed interregional distribution network 140 via VXLAN 780. Protocol transformation stack 127 is adapted to convert a layer 2 broadcast domain to/from an IP-routable form by mapping endpoint VBD 705 to access VBD 730, and encapsulating access VBD 730 into VXLAN 780.

UNI A 125 is a component of private network segment 180, which is implemented through IP-routed interregional distribution network 140.

System 100 also includes a second UNI (145 or 752), and a protocol transformation stack 185 through which the second UNI (145 or 752) is connected to IP-routed interregional distribution network 140. The second UNI (145 or 752) is also a component of private network segment 180.

UNI A 125 is located in a first access zone, i.e., access zone 210, within private network segment 180, and the second UNI, e.g., UNI 752, is located in a second access zone, e.g., access zone 630, within private network segment 180. Moreover, UNI A 125 is located in a first distribution zone, i.e., distribution zone 215, within private network segment 180, and the second UNI, e.g., UNI 752, is located in a second distribution zone, e.g., distribution zone 635, within private network segment 180.

Private network segment 180 includes access zone 210, which has an access zone switch, i.e., switch 315, and UNI A 125 includes endpoint A 305, which is connected to switch 315 via endpoint VBD 705.

Endpoint VBD 705 is configured on endpoint A 305, which is configured to extend endpoint VBD 705 over the connection between endpoint A 305 and switch 315. Switch 315 is configured to (a) allow communication on endpoint VBD 705, and (b) map endpoint VBD 705 to access VBD 730 as a function of protocol transformation stack 127.

Private network segment 180 includes distribution zone 215, which has a distribution zone switch, i.e., switch 415. Switch 315 is (a) connected to switch 415, and (b) configured to extend access VBD 730 over the connection to switch 415. Switch 415 is configured to (a) allow communication on access VBD 730, (b) encapsulate and decapsulate access VBD 730 into and out of VXLAN 780 as a function of protocol transformation stack 127, and (c) route VXLAN 780 via IP-routed interregional distribution network 140.

Private network segment 180 includes regional zone 220, which has a regional zone switch, i.e., switch 520, and IP-routed interregional distribution network 140 also includes switch 520.

Private network segment 180 includes interregional zone 225, which has an interregional zone switch, i.e., switch 625, and IP-routed interregional distribution network 140 also includes switch 625.

The techniques described herein are exemplary, and should not be construed as implying any particular limitation on the present disclosure. It should be understood that various alternatives, combinations and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "constitutes," "constituting," "comprises," and "comprising" are to be interpreted as specifying the presence of the stated features, integers, operations or components, but not precluding the presence of one or more other features, integers, operations or components or groups thereof. The terms "a" and "an" are indefinite articles, and as such, do not preclude embodiments having pluralities of articles.

What is claimed is:

1. A system comprising:
an IP-routed interregional distribution network; and
two or more IP-routed regional distribution networks that:
   map IP packets from the distribution network to and from the interregional distribution network, and
   route IP packets to and from respective user-network interfaces (UNIs); and
where each user-network interface (UNI) utilizes:
   (a) a virtual extensible local area network (VXLAN),
   (b) a first virtual broadcast domain (VBD) within a first distribution zone of a regional distribution network,
   (c) a second virtual broadcast domain (VBD) within a second distribution zone of the regional distribution network, and
   (d) a protocol transformation stack,
   wherein said UNIs are adapted for layer 2 connection to a user device via said first VBD, and adapted for layer 3 communication over its respective IP-routed regional distribution network via said VXLAN, and
   wherein said protocol transformation stack is adapted to convert a layer 2 broadcast domain to/from an IP-routable form by mapping said first VBD to said second VBD, and encapsulating said second VBD into said VXLAN.

2. The system of claim 1, wherein each UNI is a component of a private network segment that is implemented through said IP-routed interregional distribution network.

3. The system of claim 2, wherein one said UNI is a first UNI, and said protocol transformation stack is a first protocol transformation stack, and
wherein said system further comprises:
a second UNI; and
a second protocol transformation stack through which said second UNI is connected to said IP-routed interregional distribution network, and
wherein said second UNI is a component of said private network segment.

4. The system of claim 3, wherein said first UNI is located in a first distribution zone within said private network segment, and
wherein said second UNI is located in a second distribution zone within said private network segment.

5. The system of claim 2, wherein said private network segment comprises an access zone having an access zone switch, and
wherein a UNI comprises an endpoint that is connected to said access zone switch via said first VBD.

6. The system of claim 5, wherein said first VBD is an endpoint VBD configured on said endpoint,
wherein said endpoint is configured to extend said first VBD over the connection between said endpoint and said access zone switch, and
wherein said access zone switch is configured to (a) allow communication on said first VBD, and (b) map said first VBD to said second VBD as a function of said protocol transformation stack.

7. The system of claim 6, wherein said private network segment comprises a distribution zone having a distribution zone switch,
wherein said access zone switch is (a) connected to said distribution zone switch, and (b) configured to extend said second VBD over the connection to said distribution zone switch, and wherein said distribution zone switch is configured to (a) allow communication on said second VBD, (b) encapsulate and decapsulate said second VBD into and out of said VXLAN as a function of said protocol transformation stack, and (c) route said VXLAN via said IP-routed interregional distribution network.

8. The system of claim 7, wherein said private network segment comprises a regional zone having a regional zone switch, and said IP-routed interregional distribution network also comprises said regional zone switch.

9. The system of claim 8, wherein said private network segment comprises an interregional zone having an interregional zone switch, and said IP-routed interregional distribution network also comprises said interregional zone switch.

\* \* \* \* \*